(12) United States Patent  
McConnell

(10) Patent No.: US 6,366,250 B1  
(45) Date of Patent: Apr. 2, 2002

(54) WRIST MOUNTED WIRELESS INSTRUMENT AND ANTENNA APPARATUS

(75) Inventor: Richard Joseph McConnell, Rancho Cucamonga, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/457,773

(22) Filed: Dec. 9, 1999

(51) Int. Cl.$^7$ ............................. H01Q 1/12; H04B 1/16
(52) U.S. Cl. ..................... 343/718; 343/741; 455/274
(58) Field of Search ........................... 343/718, 730, 343/866; 368/10, 282, 13, 281, 278; 224/165, 174; 455/274, 351, 718

(56) References Cited

U.S. PATENT DOCUMENTS

| | | | |
|---|---|---|---|
| 4,769,656 A | * 9/1988 | Dickey | 343/718 |
| 4,847,818 A | * 7/1989 | Olsen | 368/10 |
| 4,873,527 A | 10/1989 | Tan | 343/718 |
| 4,922,260 A | 5/1990 | Gaskill et al. | 343/718 |
| 4,947,179 A | 8/1990 | Ganter et al. | 343/718 |
| 4,977,614 A | 12/1990 | Kurcbart | 455/193 |
| 5,093,670 A | 3/1992 | Braathen | 343/792.5 |
| 5,128,686 A | * 7/1992 | Tan et al. | 343/718 |
| 5,132,697 A | 7/1992 | Tan | 343/718 |
| 5,134,418 A | 7/1992 | Gomez et al. | 343/718 |
| 5,134,724 A | 7/1992 | Gehring et al. | 455/274 |
| 5,136,303 A | * 8/1992 | Cho et al. | 343/718 |
| 5,144,599 A | * 9/1992 | Blaich et al. | 368/10 |
| 5,173,715 A | 12/1992 | Rodal et al. | 343/795 |
| 5,200,756 A | 4/1993 | Feller | 343/700 MS |
| 5,239,669 A | 8/1993 | Mason et al. | 455/12.1 |
| 5,268,064 A | 12/1993 | Woo et al. | 156/630 |
| 5,268,695 A | 12/1993 | Dentinger et al. | 342/357 |
| 5,272,485 A | 12/1993 | Mason et al. | 343/700 MS |
| 5,274,613 A | * 12/1993 | Seager | 368/13 |
| D343,383 S | 1/1994 | Hall et al. | D13/133 |
| 5,280,645 A | * 1/1994 | Nguyen et al. | 455/274 |
| D346,170 S | 4/1994 | Tang | D14/230 |
| D347,436 S | 5/1994 | Tang | D14/230 |
| 5,345,244 A | 9/1994 | Gildea et al. | 342/357 |
| D361,569 S | 8/1995 | Jervis | D14/230 |
| D363,488 S | 10/1995 | Shumaker | D14/230 |
| 5,467,095 A | 11/1995 | Rodal et al. | 343/700 MS |
| 5,526,006 A | * 6/1996 | Akahane et al. | 343/718 |
| 5,530,453 A | 6/1996 | Koyama | 343/718 |
| 5,589,840 A | 12/1996 | Fujisawa | 343/718 |
| 5,742,256 A | 4/1998 | Wakabayashi | 343/718 |

\* cited by examiner

*Primary Examiner*—Don Wong  
*Assistant Examiner*—Chuc D Tran  
(74) *Attorney, Agent, or Firm*—Fulwider Patton Lee & Utecht, LLP

(57) ABSTRACT

A wrist mounted wireless instrument is provided with a wrist strap containing an antenna therein. An electrically conductive shield is disposed in the wrist strap between the antenna and the wrist to shield the antenna from the effects of the body of the user.

24 Claims, 2 Drawing Sheets

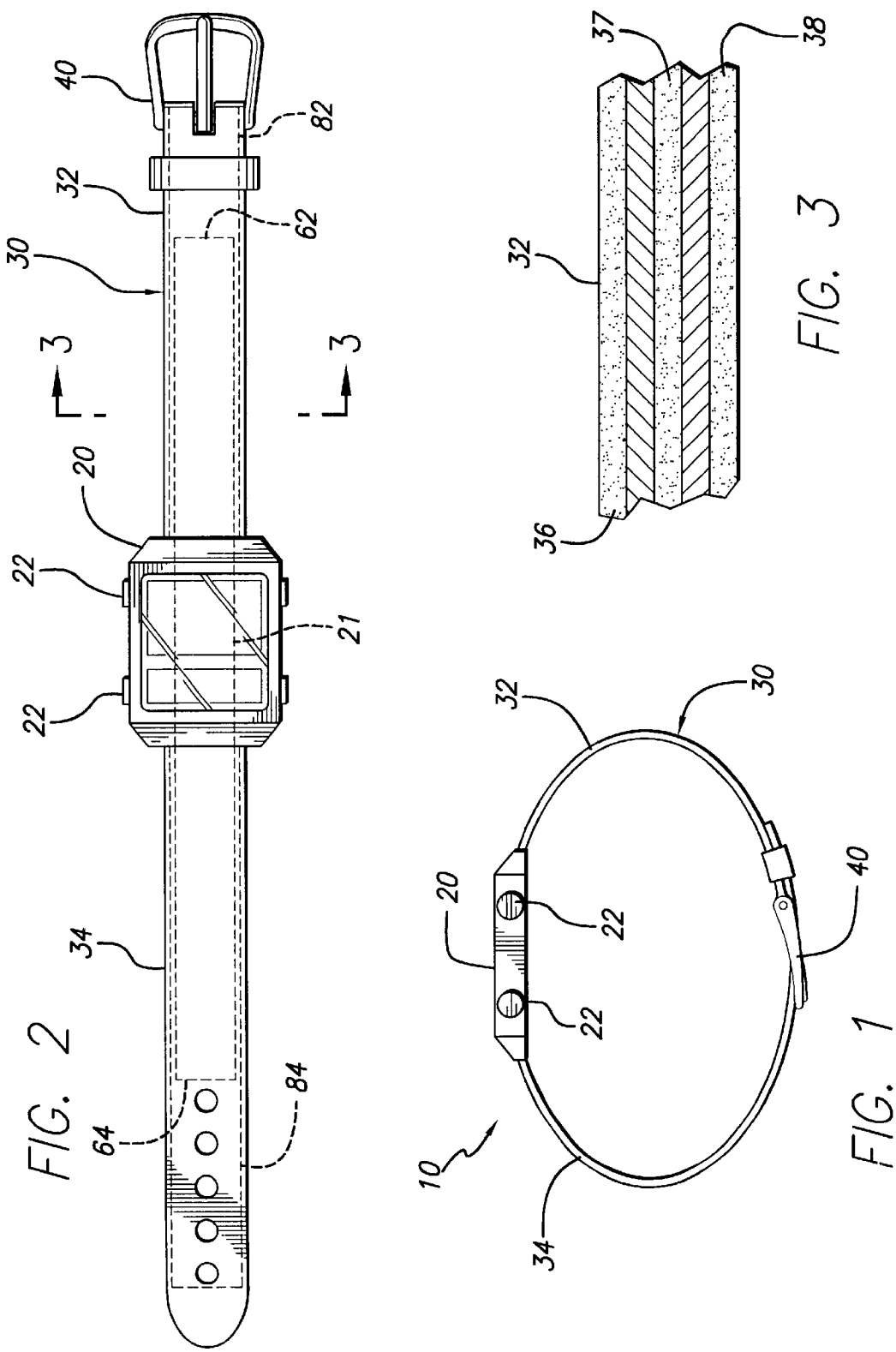

WRIST MOUNTED WIRELESS INSTRUMENT AND ANTENNA APPARATUS

BACKGROUND OF THE INVENTION

1. Field of the Invention

The present invention relates generally to a wrist mounted wireless instrument, and more particularly to an improved antenna for a wrist mounted wireless instrument formed integral with a wrist strap for the instrument and further including a shield formed integral with the wrist strap and disposed between the antenna and the wrist to shield the antenna from interference created by the body.

2. Description of the Prior Art

Wrist mounted wireless devices, including radios, pagers, and more recently Global Positioning Satellite (GPS) receivers, are well know in the art. One of the desirable characteristics of these devices is their diminutive size and weight, and as such developers of such devices are constantly striving to reduce the size of the components used. One of the main components shared by all such devices is the antenna required for receiving, and possibly also transmitting, the electromagnetic signals of interest.

The antennas utilized by modern wrist mounted devices typically fall into either of two broad categories: antennas disposed within the case of the instrument itself, or antennas disposed in the strap that secures the instrument case to the wrist of the user. Wrist strap antennas are sometimes preferred because they do not occupy any of the already very limited space available inside the instrument case, are less susceptible to electromagnetic interference from any electric circuitry located inside the instrument case, and typically display greater sensitivity because they are not handicapped by any signal attenuation caused by the instrument case. Furthermore, when loop antennas are required, the area of the loop described by a wrist strap antenna is by necessity significantly greater than that of a case antenna.

In one of the earliest patents to address a wrist strap antenna, U.S. Pat. No. 4,769,656, Dickey discloses an antenna made of a wire mesh of individual copper conductors enclosed in an elastic fabric sleeve. The conductors are loosely woven, twisted, or braided to permit lateral expansion and also to assume a flat configuration, and are preferably woven like a coaxial cable outer shield conductor. Ganter et al. disclose in U.S. Pat. No. 4,947,179 an antenna comprised of a flexible ferrite core surrounded by a flexible coil and disposed within a wrist strap. The core may be comprised of multiple strips separated by insulating strips, thus establishing tuning capacitors.

However, wrist strap antennas do suffer from certain drawbacks. For instance, when a loop antenna having a resonance circuit is brought into contact with the wrist, the wrist provides a load relative to the resonance circuit and thus greatly reduces the quality of the circuit and the overall sensitivity of the instrument. In an attempt to solve this problem, U.S. Pat. No. 5,530,453 to Koyama discloses a loop antenna for a wrist mounted instrument that includes a resonance circuit with two capacitors having a ground therebetween, thus causing the load caused by the contact between the wrist and the antenna to be applied to only one portion of the antenna and thereby preventing deterioration of the signal received by the other portion of the antenna. Akahane et al. in U.S. Pat. No. 5,526,006 attempt to prevent the problem of wrist coupling by injection molding an antenna strip into an insulating wrist strap extending from each side of the instrument case and connecting the two strips with an electrically conductive buckle. And in yet another approach, Gehring et al. disclose in U.S. Pat. No. 5,134,724 a loop antenna having a null point at its geometric middle that coincides with the electrically conductive buckle of the wrist strap, and thereby obviates the need for insulating the buckle from the wrist.

Wrist strap antennas can also function as slot antennas, in which case they are typically formed from a conductive strip fastened to the strap and divided by a lengthwise slot across which a capacitive element is electrically connected and through which, by adjusting the capacitance value, the antenna can be tuned to a desired frequency. U.S. Pat. No. 5,589,840 to Fujisawa attempts to improve upon the gain of this type of wrist strap antenna by connecting the antenna with the instrument case so as to form a loop and further disposing the capacitive element approximately near the center of a circuit board disposed within the case such that the circuit board functions as an antenna reflector. In U.S. Pat. No. 4,922,260, Gaskill et al. disclose such an antenna comprised of multiple conductive strips forming multiple discrete capacitors, such that as the length of the wrist strap changes the tuning frequency remains the same. Kurcbart accomplishes the same goal in U.S. Pat. No. 4,977,614 by engaging a variable capacitor with a spur gear actuated by teeth on the wrist strap antenna that adjust the capacitance of the capacitor as the wrist strap slides back and forth, thereby engaging the spur gear that is mechanically connected to the variable capacitor.

The antennas described above and others like them are designed to provide acceptable performance at relatively low operating frequencies, typically below 200 MHz. As the operating frequency increases the capacitance provided by the body of the user, and more particularly the portion of the wrist encircled by the antenna, presents a parallel path of sufficiently low impedance to significantly increase the loss factor for the entire antenna.

Hence, in light of the above, those skilled in the art have recognized a need for an antenna device for a wrist mounted wireless instrument that is of reduced physical size, conformable to the shape of a typical wrist carried device such as a wrist watch, and offering sufficient sensitivity and gain to be operable at higher frequencies than have been heretofore attainable. The present invention satisfies these needs as well as others.

SUMMARY OF THE INVENTION

The present invention addresses the above mentioned needs by providing an antenna device for a wrist mounted wireless instrument comprising a strap for securing the instrument to the wrist and formed with a shield for isolating the antenna element from the effects of the body of the user.

Thus, briefly and in general terms, in one aspect the present invention is directed to an antenna device for a wrist mounted wireless instrument comprised of a wrist strap attached to the instrument case, an antenna element disposed within the strap, and an electrically conductive shield disposed within the strap between the antenna element and the wrist.

In another aspect, a wireless instrument is provided and comprises a case containing the instrument circuitry, a wrist strap connected to the case, an antenna disposed within the strap and connected to the circuitry, and an electrically conductive shield disposed in the strap between the wrist and the antenna.

In further detailed aspects the antenna device may further comprise two separate strap portions, each containing an antenna element and a shield, and may be releasably secured together by a clasp that may incorporate an electrically conductive element to electrically connect the two shields.

BRIEF DESCRIPTION OF THE DRAWINGS

FIG. 1 is an elevational side view of a wireless wrist mounted instrument according to the present invention, including a wrist strap in a looped condition;

FIG. 2 is a top view, partially in section, of the instrument of FIG. 1 with the two wrist strap portions in an extended condition;

FIG. 3 is an enlarged cross-sectional side view of one the wrist strap portions shown in FIG. 1;

DETAILED DESCRIPTION OF THE PREFERRED EMBODIMENTS

Figure 4:
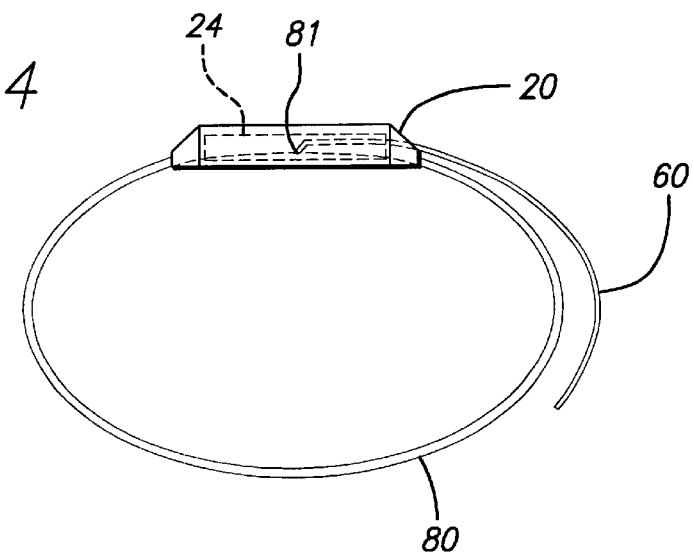
FIG. 4 is a simplified schematic side view of an alternative embodiment of the instrument of FIG. 1.

Turning now to the drawings, in which like reference numerals are used to designate like or corresponding elements among the several figures, in FIG. 1 there is shown a wireless instrument 10 according to the present invention, including an instrument case 20 and a wrist strap 30 connected to the case.

With continued reference to FIG. 1, in a preferred embodiment the wrist strap 30 is comprised of two strap portions 32, 34 releasably connected to one another by a clasp device 40. The instrument case 20 contains the instrument circuitry [not shown] and is typically provided with controls such as push buttons 22 to access the instrument functions. The instrument case 20 is typically a rigid structure sized and shaped to fit comfortably on the user's wrist, and is usually formed of materials such as stainless steel, other metals, high impact plastics, or a combination thereof. In the preferred embodiment a conductive plate 21 is mounted within, but insulated from, the case 20.

With reference now to FIG. 2, the embodiment of FIG. 1 is shown from a top view perspective with the wrist strap 32 in a linearly extended condition. Disposed within strap portions 32, 34 are antenna elements 62, 64 and shield elements 82, 84 respectively. Antenna elements 62, 64 extend longitudinally along a length of the strap portions 32,34 and are typically comprised of electrically conductive strips that are sufficiently flexible to bend along with the strap 30 as the instrument 10 is fastened to a user's wrist. The antenna elements are connected to the instrument circuitry for transferring signals between the antenna and the circuitry.

Shield elements 82, 84 are also comprised of electrically conductive strips that extend along the entire length of strap portions 32, 34 respectively and are connected to the conductive plate 21. Each shield element is disposed below the respective antenna element so that when the instrument 10 is mounted on a user's wrist each shield element is disposed between the wrist and the respective antenna element. Although the shield elements do not have to connect and thus form a closed loop, it is highly preferred that the shield elements extend sufficiently past all edges of the antenna elements to adequately shield the antenna elements from the effects of the user's body upon the electrical signals induced in the antenna elements. The antenna and shield elements are preferably formed of materials displaying a high degree of conductivity, thus allowing the use of relatively thin strips that will allow the strap 30 to be formed with a reduced profile in a flexible configuration. In one preferred embodiment, both the antenna and the shield elements are formed of a conductive material such as copper laminated onto thin strips of flexible printed circuit boards, of the type well known in the art of electrical circuits. The shield and antenna elements may be comprised of separate circuit boards, or alternatively one circuit board may be formed with the antenna element laminated along one side and the shield element laminated along the other side.

Referring to FIG. 3, wherein a cross-sectional side view of strap portion 32 is shown, each strap portion is comprised of a dielectric material formed into a top layer 36, a middle layer 37, and a bottom layer 38 arranged such that the top layer is disposed over the respective antenna element 62, 64, the middle layer is disposed between the antenna element and the respective shield element 82, 84, and the bottom layer is disposed between the shield element and the user's wrist when the instrument is mounted on the wrist. The dielectric material of the strap portions forms the main structure of the strap, provides strength and flexibility, and maintains the antenna and shield elements in spaced apart relationship and thereby insulates the antenna and shield elements from one another and from the user's wrist. It is therefore important that the material chosen be able to adequately fulfill all of these functions, and preferably also provide comfort and an aesthetically pleasing appearance. Typical rubber and plastic materials known in the art for forming wristbands are among the materials suitable for manufacturing wrist strap 30.

Referring once again to FIGS. 1 and 2, clasp device 40 is mounted on the end of strap portion 32 and is configured to receive and releasably secure the free end of strap portion 34 therein, and as such can be any of a number of such devices known in the art for securing wrist bands. In a preferred embodiment, clasp device 40 is formed of a dielectric material and includes a conductive element disposed within configured to electrically connect strap portions 32 and 34 when the strap portions are secured together by the clasp device. By way of example, clasp device 40 may be formed of a hard rubber or plastic and comprise a metallic strip disposed along its central region and connected to the shield element 82, such that the clasp metallic strip is insulated from the wrist but is in contact with shield element 84 when the strap portions are secured together by the clasp device. In this manner, when the strap portions are connected the shield elements for a closed loop together with the instrument case to completely shield the antenna elements from the effects of the user's body.

The embodiment described above and shown in FIGS. 1–3 comprises a dipole antenna, as defined by antenna elements 62 and 64. It must be understood that the present invention can also be practiced with other antenna configurations, such as a monopole antenna 60 as shown in the simplified schematic diagram of FIG. 4. Similar to the embodiment described above, the device of FIG. 4 includes an instrument comprised of circuitry 24 enclosed within instrument case 20 and connected to antenna element 60. The wrist strap is not shown in FIG. 4 for simplicity. The antenna element 60 in such a configuration may be connected to the shield 80 at a connection point 81 contained within the circuitry 24, which will typically include matching circuitry to transfer signals between the antenna element 60 and the instrument circuitry 24. The connection point will preferably be located at the physical center of the shield, where the shield can act as the ground return for the monopole antenna.

Figure 5:
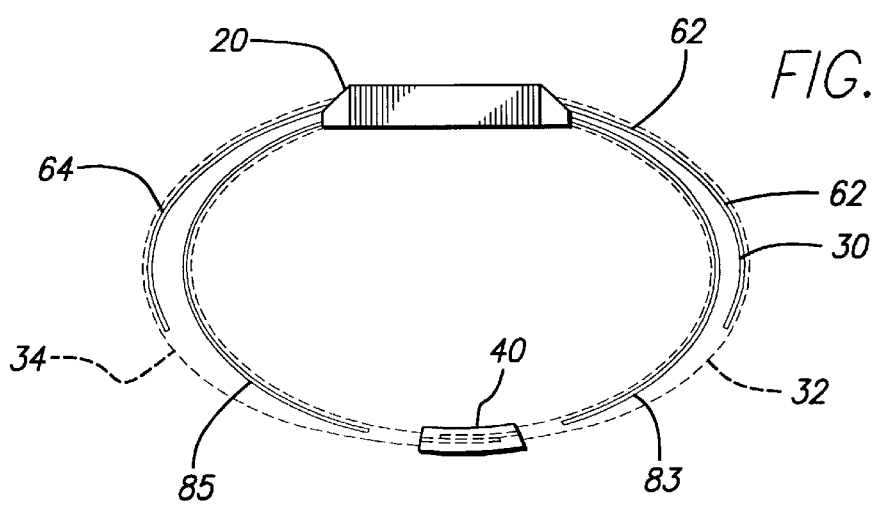
FIG. 5 is a simplified schematic side view of another alternative embodiment of the instrument of FIG. 1.

Although the preferred embodiment described previously in connection with FIGS. 1–3 includes shield elements that form a closed loop in operation, this is not required for the device of the present invention to function adequately. As previously mentioned, in most instances it will suffice to employ shield elements that extend past the edges of the antenna elements for a sufficient extent to adequately shield the antenna elements from the capacitive and inductive effects of the user's body upon the signal induced in the antenna. Thus, as shown schematically in FIG. 5, shield elements 83, 85 extend along the length of wrist strap portions 32, 34 respectively past the free ends of antenna elements 62, 64 respectively but do not join nor come in close proximity to one another even when clasp device 40 secures the strap portions together.

Figure 6:
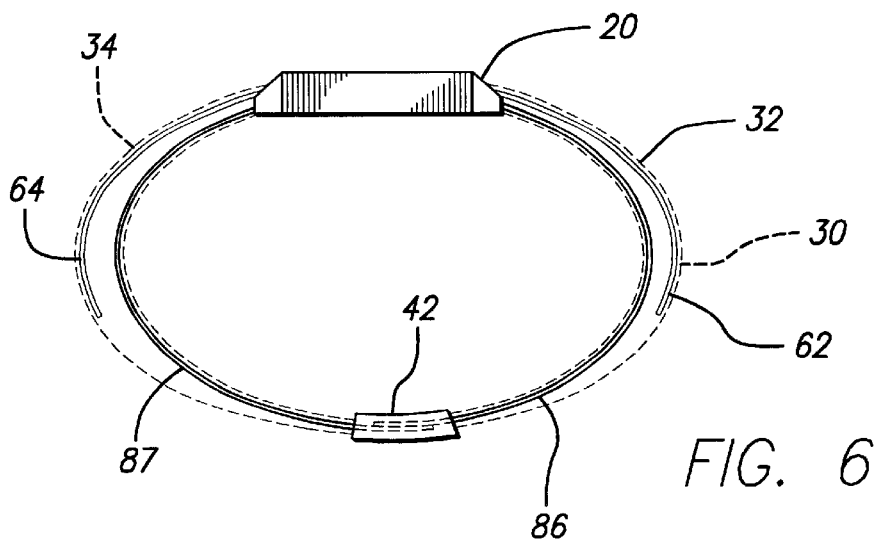
FIG. 6 is a simplified schematic side view of yet another alternative embodiment of the instrument of FIG. 1.

Forming a closed loop with the shield elements, however, is preferred because it is believed to provide enhanced shielding performance. This can be accomplished by directly connecting the shield elements, as described previously in connection with the embodiment of FIGS. 1–3, or by capacitively coupling the shield elements as shown schematically in FIG. 6. Shield elements 86, 87 in FIG. 6 extend through the entire length of strap portions 32, 34 respectively, and clasp device 42 releasably connects the two portions so as to dispose the ends of the shield elements in close proximity to one another and thus form a suitable distributed capacitance to allow the shield elements to appear to be connected as a continuous loop at the frequency of operation of the antenna.

It must further be noted that although the antenna elements disclosed elsewhere in the specification are comprised of generally rectangular conducting strips, the conductive antenna elements may be formed in various other shapes, such as multiple spaced strips, or strips taking convoluted shapes such as sinusoidal zig-zags, spirals, etc. The device of the present invention is equally practicable with all such embodiments of antenna elements provided that the shield elements extend sufficiently past the edges of the antenna elements to provide adequate shielding from the effects of the user's body. It is also understood that various variables, including the materials used, the size and shape of the strap layers, the antenna elements, and the shield elements, and the spatial relationship of these elements to one another will have an impact upon the performance of the antenna device of the present invention. These variables, however, are well within the ambit of those skilled in the art and therefore are not described further in here.

As disclosed herein, the device of the present invention provides a low cost, easily implemented method for significantly improving the performance of antennas for wrist mounted wireless instruments such as radio receivers and/or transmitters, pagers, and GPS receivers. The device of the present invention can be implemented with low cost, readily available materials using well known manufacturing processes such as injection molding. In view of the growing trend toward miniaturization and portability of electronic devices, the invention described herein provides a significant improvement in the performance of such devices.

Further modifications and improvements may additionally be made to the device disclosed herein without departing from the scope of the invention. Accordingly, it is not intended that the invention be limited, except as by the appended claims.

What is claimed is:

1. An antenna device for a wireless instrument in a wrist mounted case, comprising:
   a strap attached to the case to secure the case to the wrist;
   an antenna element connected to the instrument and disposed within the strap; and
   an electrically conductive ground shield electrically connected within the instrument case and disposed within the strap between the antenna element and the wrist.

2. The device of claim 1, wherein the antenna element comprises an electrically conductive strip extending along at least a length of the wrist strap.

3. The device of claim 2, wherein the ground shield extends along a longer length of the strap than the antenna element.

4. The device of claim 2, wherein the strap is formed of a dielectric material.

5. The device of claim 4, wherein a portion of the dielectric material is disposed between the ground shield and the wrist to insulate the ground shield from the wrist.

6. The device of claim 5, wherein a portion of the dielectric material is disposed between the ground shield and the antenna element to insulate the antenna element from the ground shield.

7. The device of claim 3, further comprising:
   a conductive plate disposed within the case and connected to the ground shield; and wherein
   the ground shield extends along the entire length of the strap to form a closed loop with the case conductive plate.

8. The device of claim 1, wherein the strap is comprised of two elongated portions attached to the case and each comprising an antenna element and a ground shield element.

9. The device of claim 8, further comprising:
   a clasp device attached to one of the strap portions to releasably secure to the other strap portion.

10. The device of claim 9, wherein each antenna element comprises an electrically conductive strip extending along at least a portion of the respective wrist strap portion.

11. The device of claim 10, wherein each ground shield element extends along a longer portion of the respective strap portion than the respective antenna element.

12. The device of claim 11, wherein the strap portions are formed of a dielectric material.

13. The device of claim 12, wherein a portion of the dielectric material in each strap portion is disposed between the respective ground shield element and the wrist to insulate each shield from the wrist.

14. The device of claim 13, wherein a portion of the dielectric material is disposed between each ground shield element and the respective antenna element to insulate each antenna element from the respective ground shield element.

15. The device of claim 14, further comprising:
   a conductive plate disposed within the case and connected to the ground shield elements; and wherein
   each ground shield element extends along the entire length of the respective strap portion; and
   the clasp is formed with an electrically conductive element to electrically connect the two ground shield elements to form a closed loop with the case conductive plate when the strap portions are secured together by the clasp.

16. The device of claim 7, wherein the antenna element is connected to the ground shield at a point located at approximately the electrical center of the ground shield.

17. The device of claim 16, wherein the antenna element is connected to the clasp conductive element.

18. The device of claim 14, wherein:
   each ground shield element extends along the entire length of the respective strap portion; and the clasp is configured to secure the two strap portions in at least partially overlying relationship to capacitively couple the ground shield elements.

19. A wireless instrument device, comprising:
a case configured for attachment to a user's wrist;
a strap to secure the case to the wrist;
circuitry disposed within the case to process electrical signals;
an antenna disposed within the strap and connected to the circuitry to transfer signals thereto; and
an electrically conductive ground shield electrically connected within the instrument case and disposed within the strap between the antenna and the wrist and configured to shield the antenna from the inductive and capacitive effects of the user's body.

20. The device of claim 19, further comprising:
a conductive plate disposed within the case and connected to the ground shield to form a closed loop therewith.

21. The device of claim 20, wherein the strap is comprised of two elongated portions attached to the case and each comprising an antenna element and a ground shield element.

22. The device of claim 21, further comprising:
a clasp device attached to the end of a strap portion to releasably secure to the other strap portion and connect the shield elements to one another.

23. The device of claim 21, wherein the antenna elements form a dipole antenna.

24. The device of claim 19, wherein the antenna is a monopole antenna.

* * * * *